March 20, 1934.  W. S. SAUNDERS  1,951,674
UPHOLSTERED SEAT CONSTRUCTION
Filed June 23, 1932
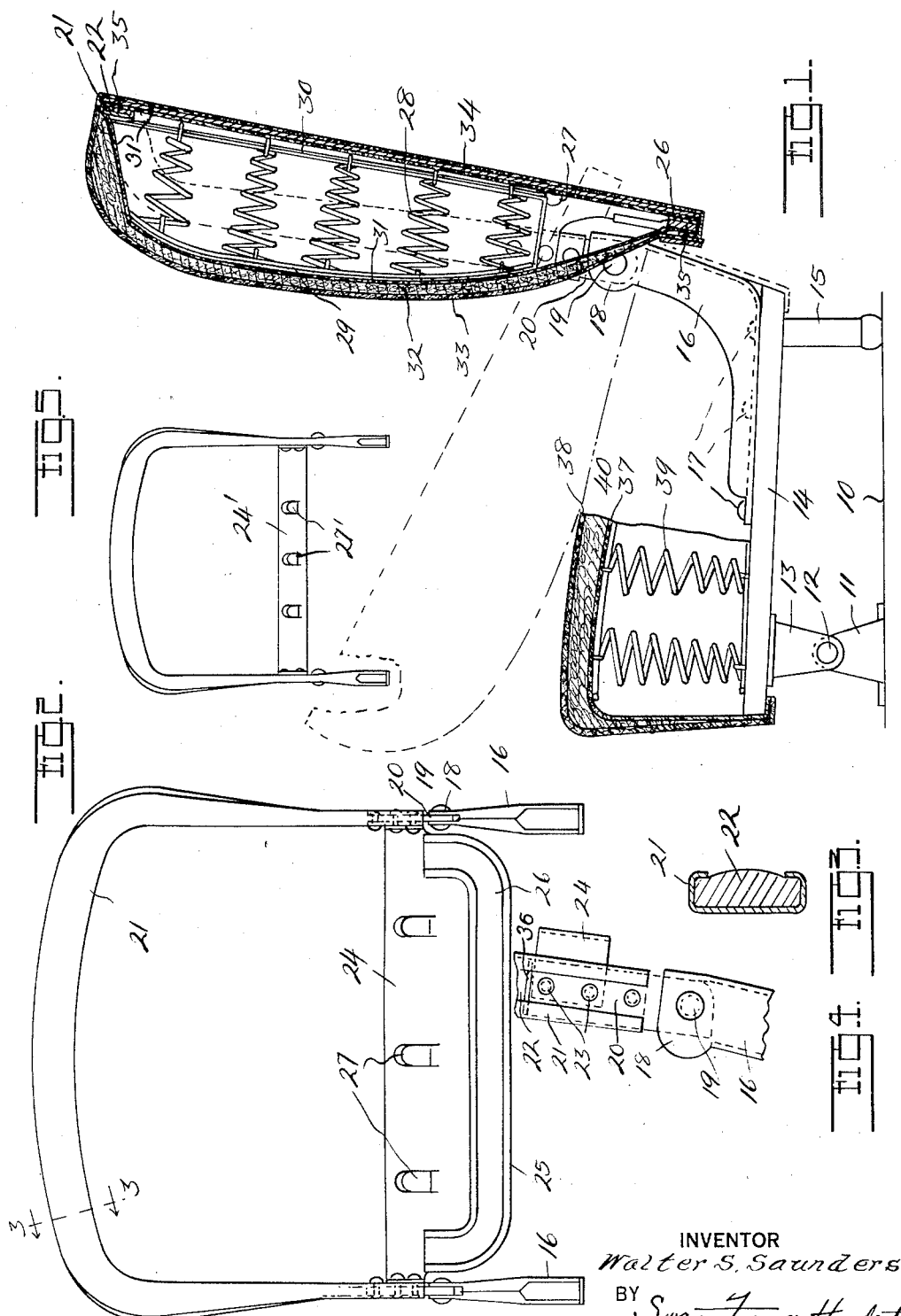
INVENTOR
Walter S. Saunders
BY Swan, Frye & Hardesty
ATTORNEYS Patented Mar. 20, 1934

1,951,674

UNITED STATES PATENT OFFICE 1,951,674

UPHOLSTERED SEAT CONSTRUCTION

Walter S. Saunders, Pontiac, Mich., assignor to The American Forging and Socket Company, Pontiac, Mich., a corporation of Michigan Application June 23, 1932, Serial No. 618,981

2 Claims. (Cl. 155—180)

This invention relates to upholstered chair or seat constructions, and more particularly to an improved and simplified upholstered seat especially adapted for use in motor vehicles. An important object of the invention is the provision of such a seat, having a hinged back, which will be of very rigid and sturdy yet inexpensive construction.

Another important object of this invention is the provision of such an economical yet rugged automobile seat, the framework of which is formed almost entirely of sheet metal, yet which incorporates therein means whereby the upholstery may be secured in place by ordinary tacks or upholstery nails.

A still further object of this invention is the provision of such a seat construction in which novel means is provided for securing the spring assembly to and within the seat back, and for securing the upholstery covering in position.

Other objects and advantages will be apparent from the following description wherein reference is made to the accompanying drawing illustrating preferred embodiments of my invention, and wherein similar reference numerals designate similar parts throughout the several views.

In the drawing:

Figure 1 is a vertical sectional view taken substantially centrally through an automobile seat incorporating the principles of my invention, part of the seat upholstery being broken away;

Figure 2 is a front elevational view of the seat back framework;

Figure 3 is a detail sectional view taken substantially on the line 3—3 of Figure 2 and looking in the direction of the arrows;

Figure 4 is a fragmentary enlarged detail side elevational view of part of the seat back framework and hinged supporting means therefor, and Figure 5 is a view similar to Figure 2, although on a smaller scale, showing a somewhat modified back construction.

Referring now to the drawing: Reference character 10 designates a floor, here contemplated as being the floor of a vehicle, to which is suitably secured by any desired means, (not shown) a bracket 11, pivoted to which, as upon the pin 12, is the seat-supporting bracket 13, which, together with the bracket 11, will thus be seen to comprise a hinged front leg for the seat base 14. Usually two such hinged front legs are employed, one at each corner of the seat, while carried by the rear of the base 14 may be one or more rigid legs 15, which bear against the floor when the seat is in its normal position of use, in which it is shown in Figure 1.

Arranged one at each rear corner of the baseboard 14 are a pair of angle bracket back supporting members 16, which may be formed of sheet metal, as shown in Figures 1 and 2. The bottom leg of each bracket may be secured to the base board 14, as by screws 17, while the top of the upwardly extending arm is provided with a transversely apertured bearing portion 18 having spaced sides.

As best shown in Figure 2, the upwardly extending arm of the bracket 16 is tubular, and pivoted in its bearing portion 18, as upon the pin 19, is a bar 20, of rectangular cross-section, so contoured, as shown in Figure 4, that when in upright position it forms a continuation of the rear leg of the bracket and supports the seat back, while as indicated in dotted lines in Figure 1, it may be folded forwardly to enable laying the back down upon the seat in the usual manner of folding back seats.

The supporting seat back framework comprises an elongated sheet metal strip 21 of inverted U-contour, cross-sectionally bent as shown in Figure 3 to retain a tacking strip 22 which extends substantially the entire length of the frame strip 21, although stopping short of its lower ends, as at 36 (note Figure 4). To the tacking strip 22, which may be formed of fiber, pulp composition, or the like, the upholstery and fabric covering may be secured by nailing or tacking. The lower extremities of the looped frame member 21 extend over the hinged supporting members 20, which are of substantially the same cross-sectional size as the tacking strip, and are secured thereto, as by rivets 23.

Secured by means of the same rivets 23 and extending across the lower ends of the legs of the U-shaped frame member 21 may be an upholstery supporting and bracing member 24, shown formed of sheet metal and carrying at its lower edge a channel 25 contoured to retain a similar tacking strip 26, by crimping the edge of the channel down upon it. Punched inwardly from the strap 24 I provide securing tabs 27, constituting upwardly opening hooks into which may be slipped one of the lower frame wires of a spring assembly, which may be retained therein by bending down the tabs. The upholstery framework is generally designated 28, and comprises front and rear supporting wire frames 29—30 respectively, connected by a plurality of interposed coiled springs arranged in the conventional or any other desired manner. The rearmost frame 30 is of course designed to fit and substantially conform to the shape of the frame members 21—24, while the front frame generally conforms to the desired finished contour of the back cushion, as best shown in Figure 1.

After the tabs 27 are bent down to prevent displacement of the spring framework, an envelope or casing 31, which may be of burlap, is slipped over the entire back assembly over which in turn may be arranged a layer of padding 32 and an outer casing 33. Between the inner and outer casings in the back portion of the seat the stiffening fiber or cardboard member 34 may be used rather than the padding, which may be employed only in the front of the cushion, as shown in Figure 1. The casings, and so the entire upholstery assembly, are secured in position by tacking the casings to the strips 22—26, as by tacks 35, in the manner shown in Figure 1. The casings are of course so contoured that they are held taut and smooth by the springs, and the casings also retain the spring assembly, and prevent it falling away from the frame.

The seat construction shown is of a well known variety. The base board 14 is of wood, and the inner and outer upholstery casings 37—38 respectively are tacked to the under side thereof and over a spring assembly 39, while between them is arranged padding 40.

Instead of the lower frame member 24 carrying the tacking strip retaining channel 26, I may, as shown in Figure 5, employ a plain cross strap 24' without such channel but carrying retaining tabs 27' for the spring assembly in similar fashion, and secure the lower ends of the upholstery casings together by sewing them to each other underneath the strap, rather than by tacking.

It will thus be seen that in spite of the extreme simplicity of my improved seat construction, it furnishes a completely finished spring-upholstered swinging back seat of the most comfortable and desirable sort for vehicle use, the cost of construction of which is far less than that of any comparable seat design of which I am aware.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. In an upholstered chair, in combination with a base and a seat carried thereby, a back hingedly carried by the base, a back frame member of channeled section and substantially inverted U-contour, a tacking strip retained within the channel but stopping short of the lower ends of the frame member, a bracing and supporting member extending across and adjacent the ends of the legs of the frame, and means for hingedly supporting the back frame member and securing the bracing member thereto, comprising a pair of bars of substantially the same cross sectional size as the tacking strip, one within and projecting from each lower end of the channel and pivotally supported by the base, the frame, bars and bracing member having registering overlapping portions, and unitary securing means securing together such registering portions.

2. In an upholstered chair construction, a seat portion, a back hingedly carried thereby including a bowed marginal back frame member having a channeled portion and of substantially inverted U-contour, a tacking strip within and substantially filling the channel of the frame member but stopping short of its lower ends, a cross bracing member extending between the lower ends of the legs of the frame, and means for stiffening and hingedly supporting the back frame and for securing the cross brace thereto, comprising a pair of stiffening and securing bars, one arranged within and projecting from each lower end of the channel and also substantially filling the same, and common fastening means securing together the channeled frame, inserted bars and cross bracing members, said members being arranged with overlapping secured portions.

WALTER S. SAUNDERS.